United States Patent Office 2,773,883
Patented Dec. 11, 1956

2,773,883

PREPARATION OF HALOBENZOQUINONES

Van R. Gaertner, Dayton, Ohio, assignor to Monsanto Chemical Company, St. Louis, Mo., a corporation of Delaware No Drawing. Application November 27, 1953, Serial No. 394,885

8 Claims. (Cl. 260—396)

This invention relates to novel methods for the preparation of certain types of halobenzoquinones. More specifically, the invention relates to novel methods for the preparation of esohalo-1,4-benzoquinones having a cycloaliphatic ring fused thereto through adjacent carbon atoms of the benzoquinone nucleus. Such compounds can be represented by the formula

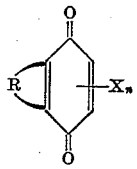

wherein X is a halogen atom, $n$ is 1 or 2, and R is an aliphatic radical. R can be either a saturated or an unsaturated radical and can be either straight or branched chain. Furthermore, as will be noted from the examples presented hereinafter, R can be substituted with polar groups without adversely affecting the course of the present reaction. A preferred embodiment of the present invention involves the formation of compounds of the above class wherein R is an unsaturated aliphatic radical.

The present process is particularly applicable to the formation of 5,8-dihydro-1,4-naphthoquinones which are substituted with a halogen atom at either or both of the 2 and 3 carbon atoms.

The present invention involves the formation of the aforementioned haloquinones by dehydrohalogenation of 5,6-dihydro-5-halo-1,4-benzoquinones having a cycloaliphatic ring fused thereto through the 5 and 6 positions of the benzoquinone, said benzoquinone containing at least one vinyl halogen atom on a carbon atom alpha to the carbonyl group, and having the angular (5) halogen atom in cis-relationship to the corresponding angular (6) hydrogen atom. Such compounds can be represented by the formula

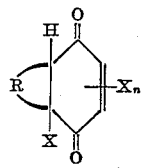

wherein X is a halogen atom, $n$ is 1 or 2, and R is an aliphatic radical as defined above.

Examples of suitable dihydrohalobenzoquinone reactants for dehydrohalogenation according to the present invention are 2,4a-dichloro-4a,5,8,8a-tetrahydro-1,4-naphthoquinone; 2,4a-dichloro-6-methyl-4a,5,8,8a-tetrahydro-1,4-naphthoquinone; 4a,5,8,8a-tetrahydro-2,3,4a-trichloro-1,4-naphthoquinone; 2,4a-dibromo-5,8-methano-4a,5,8,8a-tetrahydro-1,4-naphthoquinone; 2,8a-dichloro-7-methyl-4a,5,8,8a-tetrahydro-1,4-naphthoquinone; etc., in which the angular hydrogen and halogen atoms are in cis-relationship with each other.

The foregoing and other similar naphthoquinones can be readily obtained by a Diels-Alder reaction involving dienes and polyhalo-1,4-benzoquinones. Such a preparation is particularly useful because it utilizes readily available raw materials, can be easily carried out, and results in adducts which have angular substituents in cis-relationship to each other. Examples of suitable dienes for the preparation of such adducts are butadiene-1,3, n-pentadiene-1,3, isoprene, 2,3-dimethylpentadiene-1,3, chloroprene or its bromo or iodo analogues, 2-ethylbutadiene-1,3, cyclopentadiene, gem-dichlorocyclopentadiene, 1-acetoxybutadiene-1,3, and the like. Examples of polyhalo-1,4-benzoquinones suitable for adduct formation with the aforementioned dienes are 2,5-dichloro-1,4-benzoquinone, 2,6-dichloro-1,4-benzoquinone, 2,5-dibromo-1,4-benzoquinone, 2,3,5-trichloro-1,4-benzoquinone, and various other di- and tri-halo-1,4-benzoquinones.

The dehydrohalogenating reagents used in the present process are alkylpyridines having an alkyl group on the alpha carbon atom thereof. A preferred group of dehydrohalogenating agents comprises the polyalkylpyridines having at least one alpha alkyl group and, preferably, at least two alpha alkyl groups. Particularly effective alkylpyridines are the trialkylpyridines which have two of the alkyl groups on alpha carbon atoms. The alkyl groups of the present dehydrohalogenating agents are preferably lower alkyl groups, such as methyl and ethyl groups. Specific examples of the foregoing alkylpyridines are α-collidine, γ-collidine, α-picoline, aldehyde collidine (5-ethyl-2-methylpyridine), 2,6-dimethylpyridine, 2,4-dimethylpyridine, 2-ethylpyridine, 2,6-diethylpyridine, etc.

As was mentioned previously, the halobenzoquinones of the present invention are prepared by dehydrohalogenation of a dihydropolyhalobenzoquinone. For example, 2,4a-dichloro-4a,5,8,8a-dihydro-1,4-naphthoquinone can be readily dehydrohalogenated with γ-collidine to give 2-chloro-5,8-dihydro-1,4-naphthoquinone as indicated by the following reaction:

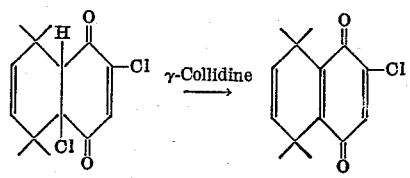

Particular attention is directed to the facts (1) that the angular chlorine and hydrogen atoms are in a cis-relationship to each other, in which relationship they would ordinarily be very difficult to remove and (2) that the other (vinyl) halogen atom is on a beta-carbon atom of an alpha-beta unsaturated carbonyl group and, consequently, would be expected to be more reactive than the angular chlorine atom. In spite of the foregoing facts, the dehydrohalogenation of the particular compounds according to the present invention results in the removal of the cis-angular halogen in preference to reaction with a carbonyl-activated vinyl halogen.

The present reactions are spontaneous exothermic reactions which can be readily carried out by adding the dehydrohalogenating agent to the dihydropolyhalobenzoquinone in a suitable diluent solvent, such as benzene or similar aromatic solvent. The by-product hydrogen halide salt of the dehydrohalogenating agent will precipitate from solution and can be removed by conventional procedures, such as decantation or filtration.

Further details relative to the processes involved in the present invention will be apparent from the following examples.

EXAMPLE 1

*Preparation of 2,4a-dichloro - 4a,5,8,8a - tetrahydro-1,4-naphthoquinone*

Ten grams of butadiene-1,3, 17.7 g. of 2,5-dichloro-1,4-benzoquinone and 80 ml. of benzene were charged to a bomb cooled with Dry Ice, allowed to react for 66 hours at 80° C., and then allowed to cool. The reaction mixture was removed and concentrated by distillation. When diluted with methanol, off-white crystalline needles precipitated. Further purification by treatment of the methanol solution with charcoal, recrystallization from methanol and drying under vacuum gave faintly yellow colored needles of 2,4a-dichloro-4a,5,8,8a-tetrahydro-1,4-naphthoquinone, M. P. 84–86° C. Analyses: Calculated ($C_{10}H_8Cl_2O_2$), C=51.98%, H=3.49%; found, C=52.42%, H=3.80%. The yield of product was 83%, based upon dichlorobenzoquinone reactant.

EXAMPLE 2

*Preparation of 2-chloro-5,8-dihydro-1,4-naphthoquinone*

A benzene solution of 2,4a-dichloro - 4a,5,8,8a - tetrahydro - 1,4 - naphthoquinone prepared in the manner described in Example 1, was concentrated to about 25 ml., cooled and mixed with 15 ml. of γ-collidine. The reaction proceeded smoothly and exothermically over a period of about 2 hours to yield γ-collidine hydrochloride and 2-chloro-5,8-dihydro - 1,4 - naphthoquinone. The latter material was characterized by oxidation with chromic acid to give 2-chloro-1,4-naphthoquinone.

EXAMPLE 3

*Preparation of 2-chloro-5,8-dihydro - 6,7 - dimethyl-1,4-naphthoquinone*

A solution of 2,4a-dichloro - 6,7 - dimethyl-4a,5,8,8a-tetrahydro-1,4-naphthoquinone was prepared by refluxing 17.7 g. of 2,5-dichloro-1,4-benzoquinone and 8.2 g. of 2,3-dimethylbutadiene-1,3 in 100 ml. of benzene for about 24 hours. After the solution had been cooled, there was added thereto 15 ml. of γ-collidine. The mixture was allowed to stand for 2 days, during which time solid γ-collidine hydrochloride precipitate and 2-chloro-5,8 - dihydro - 6,7 - dimethyl - 1,4 - naphthoquinone were formed. The chlorodihydrodimethylnaphthoquinone was characterized by oxidation with chromic acid to give 2-chloro-6,7-dimethyl-1,4-naphthoquinone. The yield of chlorodihydrodimethylnaphthoquinone was better than 86%, based on naphthoquinone reactant.

EXAMPLE 4

*Preparation of mixture of 2,6-dichloro-5,8-dihydro-1,4-naphthoquinone and 2,7-dichloro - 5,8 - dihydro - 1,4-naphthoquinone*

A solution of 4a,5,8,8a-tetrahydro - 2,4a,7 - trichloro-1,4 - naphthoquinone mixed with the 2,4a,6 - trichloro isomer thereof was prepared by refluxing 17.7 g. of 2,5-dichloro-1,4-benzoquinone and 8.8 g. of chloroprene in 100 ml. of benzene for 48 hours. After cooling the solution, 15 ml. of γ-collidine was added thereto. Reaction was initiated by heating the mixture to about 60° C., after which cooling was necessary to maintain the temperature between 50 and 60° C. The mixture was allowed to stand for about 16 hours, during which time the reaction was completed to give γ-collidine hydrochloride and a mixture of 2,6-dichloro-5,8-dihydro-1,4-naphthoquinone and 2,7-dichloro-5,8-dihydro-1,4-naphthoquinone, which were characterized by oxidation with chromic acid to the corresponding aromatic dichloronaphthoquinones.

EXAMPLE 5

*Preparation of 2-chloro-5,8-dihydromethyl-1,4-naphthoquinone*

A solution of 2,4a-dichloro-methyl - 4a,5,8,8a - tetrahydro-1,4-naphthoquinone was prepared by refluxing 17.7 g. of 2,5-dichloro-1,4-benzoquinone and 6.8 g. of isoprene in 100 ml. of benzene for 24 hours. The solution was allowed to cool and 15 ml. of γ-collidine was added thereto. Reaction proceeded slowly over a period of about 16 hours to give a better than 70% yield of 2-chloro-5,8-dihydromethyl - 1,4 - naphthoquinone which was characterized by oxidation with chromic acid to give 2-chloro-6-methyl-1,4-naphthoquinone in admixture with its 7-methyl isomer.

EXAMPLE 6

*Preparation of 2-chloro-5,8-dihydrodimethyl-1,4-naphthoquinone*

A solution of 2,4a-dichlorodimethyl - 4a,5,8,8a - tetrahydro-1,4-naphthoquinone was prepared by refluxing 17.7 g. of 2,5 - dichloro - 1,4 - benzoquinone and 12.3 g. of 2-methylpentadiene-1,3 in 100 ml. of benzene for 24 hours. After cooling, all but 50 ml. of the solution was mixed with 10 ml. of γ-collidine and warmed to about 45° C. The reaction mixture was allowed to stand for about 72 hours, during which time solid γ-collidine hydrochloride precipitated from the solution. The solid collidine hydrochloride was removed by filtration, leaving a solution of 2-chloro-5,8-dihydro-5,7-dimethyl-1,4-naphthoquinone and 2-chloro-5,8-dihydro-6,8-dimethyl-1,4-naphthoquinone. The mixture of chlorodihydrodimethylnaphthoquinones was characterized by oxidation with chromic acid to give the corresponding chlorodimethylnaphthoquinones.

EXAMPLE 7

*Preparation of 2-chloro-5,8-dihydro-methyl-1,4-naphthoquinone*

A solution of 2,8a - dichloromethyl - 4a,5,8,8a - tetrahydro-1,4-naphthoquinone was prepared by refluxing 9 g. of 2,6-dichloro-1,4-benzoquinone and 3.5 g. of isoprene with 100 ml. of benzene for 24 hours. After cooling the solution, 10 ml. of γ-collidine was added thereto and allowed to stand for about 16 hours, during which time γ-collidine hydrochloride was formed and precipitated from solution. The product remaining in solution was a mixture of 2-chloro - 5,8 - dihydro - 6 - methyl-1,4-naphthoquinone and 2-chloro-5,8-dihydro-7-methyl-1,4-naphthoquinone which was characterized by oxidation with chromic acid to give the corresponding aromatic chloromethylnaphthoquinones.

EXAMPLE 8

*Preparation of isomeric mixture of 2,6-dichloro-5,8-dihydro-1,4-naphthoquinone and 2,7-dichloro-5,8-dihydro-1,4-naphthoquinone*

An isomeric mixture of 2,6-dichloro-4a,5,8,8a-tetrahydro - 1,4 - naphthoquinone and 2,7-dichloro-4a,5,8,8a-tetrahydro-1,4-naphthoquinone in a benzene solution was prepared by refluxing 9 g. of 2,6-dichloro - 1,4 - benzoquinone and 5 g. of chloroprene in 100 ml. of benzene for 30 hours. The solution was cooled, and 15 ml. of γ-collidine was added thereto. The mixture was allowed to stand for several days, during which time γ-collidine hydrochloride precipitated therefrom leaving the isomeric mixture of 2,6-dichloro- and 2,7-dichloro-5,8-dihydro-1,4-naphthoquinones, which were characterized by oxidation with chromic acid to give the corresponding mixture of aromatic dichloronaphthoquinones.

I claim:

1. The method of preparing an eso-halo-1,4-benzoquinone having a cycloaliphatic ring fused thereto through adjacent carbon atoms, which method comprises dehydrohalogenating a 5,6-dihydro-eso-polyhalo-1,4-benzoquinone having a cycloaliphatic ring fused thereto through the 5- and 6-carbon atoms, having at least one vinyl halogen atom attached to the benzoquinone nucleus and having an angular halogen atom attached to the 5-carbon atom and in cis-relationship to an angular hydrogen atom attached to the 6-carbon atom, the dehydrohalogenation comprising the removal of said angular halogen atom and said angular hydrogen atom by reaction with an alkyl pyridine having a lower alkyl group attached to the α-carbon atom thereof.

2. The method of preparing an eso-chloro-1,4-benzoquinone having an unsaturated 6-membered cycloaliphatic ring fused thereto through adjacent carbon atoms, which method comprises dehydrochlorinating a 5,6-dihydro-eso-polychloro-1,4-benzoquinone having an unsaturated 6-membered cycloaliphatic ring fused thereto through the 5- and 6-carbon atoms, having at least one vinyl chlorine atom attached to the benzoquinone nucleus, and having an angular chlorine atom attached to the 5-carbon atom and in cis-relationship to an angular hydrogen atom attached to the 6-carbon atom, said dehydrochlorination comprising the removal of said angular chlorine atom and said angular hydrogen atom by reaction with an alkyl pyridine having a lower alkyl group of not more than two carbon atoms attached to each of the α-carbon atoms thereof.

3. The method of preparing a 2-chloro-5,8-dihydro-1,4-naphthoquinone which method comprises dehydrochlorinating a 2-chloro-4a,5,8,8a-tetrahydro-1,4-naphthoquinone having an angular chlorine atom and an angular hydrogen atom attached to the 4a and 8a-positions thereof and in cis-relationship to each other, said dehydrochlorination comprising the removal of said angular chlorine atom and said angular hydrogen atom by reaction with γ-collidine.

4. The method of preparing 2-chloro-5,8-dihydro-1,4-naphthoquinone, which method comprises dehydrochlorinating, by reaction with γ-collidine, 2,4a-dichloro-4a,5,8,-8a-tetrahydro-1,4-naphthoquinone having an angular hydrogen atom in the 8a-position in cis-relationship to the chlorine atom in the 4a-position.

5. The method of preparing 2-chloro-5,8-dihydro-6,7-dimethyl-1,4-naphthoquinone, which method comprises dehydrochlorinating, by reaction with γ-collidine, 2,4a-dichloro - 6,7 - dimethyl - 4a,5,8,8a - tetrahydro - 1,4 - naphthoquinone having an angular hydrogen atom in the 8a-position in cis-relationship to the chlorine atom in the 4a-position.

6. The method of preparing 2,6-dichloro-5,8-dihydro-1,4-naphthoquinone, which method comprises dehydrochlorinating, by reaction with γ-collidine, 4a,5,8,8a-tetrahydro-2,4a,7-trichloro-1,4-naphthoquinone having an angular hydrogen atom in the 8a-position in cis-relationship to the chlorine atom in the 4a-position.

7. The method of preparing 2-chloro-5,8-dihydro-6-methyl-1,4-naphthoquinone, which method comprises dehydrochlorinating, by reaction with γ-collidine, 2,4a-dichloro - 6 - methyl - 4a,5,8,8a - tetrahydro - 1,4 - naphthoquinone having an angular hydrogen atom in the 8a-position in cis-relationship to the chlorine atom in the 4a-position.

8. The method of preparing a compound of the class

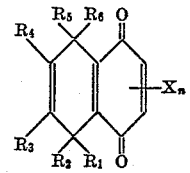

wherein X is a member selected from the group consisting of chlorine, bromine and iodine, $n$ is an integer from 1 to 2, and $R_1$, $R_2$, $R_3$, $R_4$, $R_5$, and $R_6$ are members selected from the group consisting of hydrogen, chlorine, bromine, iodine and lower alkyl groups, which method comprises dehydrohalogenating a compound of the class

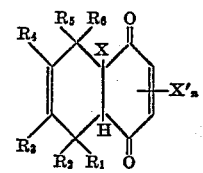

wherein X and X' are members selected from the group consisting of chlorine, bromine, and iodine, $n$ is an integer from 1 to 2, and $R_1$, $R_2$, $R_3$, $R_4$, $R_5$, and $R_6$ are as defined above, the angular halogen atom and angular hydrogen atom attached to the 4a and 8a positions thereof being in cis-relationship to each other, said dehydrohalogenation comprising the removal of said angular halogen atom and said angular hydrogen atom by reaction with an alkyl pyridine having a lower alkyl group of not more than two carbon atoms attached to each of the α-carbon atoms thereof.

References Cited in the file of this patent

UNITED STATES PATENTS 1,967,862  Carothers _____ July 24, 1934